(12) United States Patent
Najafi

(10) Patent No.: US 7,017,628 B2
(45) Date of Patent: Mar. 28, 2006

(54) ECOLOGICALLY FRIENDLY FUNNEL

(75) Inventor: Ramin Najafi, Novato, CA (US)

(73) Assignee: California Pacific Lab, Inc., Novato, CA (US)

( * ) Notice: Subject to any disclaimer, the term of this patent is extended or adjusted under 35 U.S.C. 154(b) by 0 days.

(21) Appl. No.: 11/132,813

(22) Filed: May 18, 2005

(65) Prior Publication Data

US 2005/0263210 A1    Dec. 1, 2005

Related U.S. Application Data

(60) Provisional application No. 60/574,395, filed on May 25, 2004.

(51) Int. Cl.
   *B65B 1/04*  (2006.01)
(52) U.S. Cl. .................. 141/297; 141/299; 141/331
(58) Field of Classification Search ........ 141/297–300, 141/331–347
See application file for complete search history.

(56) References Cited

U.S. PATENT DOCUMENTS

| | | | | | |
|---|---|---|---|---|---|
| 530,228 | A | * | 12/1894 | Keiner | 141/292 |
| 1,676,986 | A | * | 7/1928 | Hilford | 141/300 |
| 3,973,602 | A | * | 8/1976 | Kruse | 141/95 |
| 5,676,185 | A | * | 10/1997 | Starr et al. | 141/300 |

\* cited by examiner

*Primary Examiner*—Steven O. Douglas
(74) *Attorney, Agent, or Firm*—Heller Ehrman LLP

(57) ABSTRACT

The present invention provides an apparatus for the environmentally safe transfer and disposal of solvents, such as waste solvents, and eliminate atmospheric contamination from evaporated solvents. The apparatus may also be used for the transfer of solvents into storage containers for further recycling and re-use. In addition, the apparatus eliminates the multiple steps and tedious procedures that are typically required for transferring solvent into storage or waste containers for storage and disposal.

23 Claims, 7 Drawing Sheets

ECOLOGICALLY FRIENDLY FUNNEL

CROSS-REFERENCE TO RELATED APPLICATIONS

This application claims the benefit of U.S. Provisional Application No. 60/574,395, filed May 25, 2004, entitled "Ecologically Friendly Funnel" the disclosure of which is incorporated herein in its entirety.

BACKGROUND OF THE INVENTION

1. Field of the Invention

This invention relates generally to funnels, specifically to a funnel which prevents the emission of ecologically and/or environmentally harmful vapors from its underlying container.

2. Description of Related Art

Laboratories and other facilities which use volatile chemicals, such as benzene, dichloromethane and other solvents and diluents, usually have frequent needs to dispose of quantities of such chemicals. For example, a research laboratory may use benzene, acetone, dichloromethane to clean lab ware, dichloromethane (methylene chloride) to elute an impurity from a substance in chromatographic procedures, or may generate various organic waste from performing chemical or biochemical research. Waste solvents or solvent mixtures that are not recyclable usually contain contaminants and thus must be disposed.

In a typical research and development facility, the disposal of such waste solvents are performed by disposing the solvent in a container such as a carboy that may be made of polypropylene or glass. In standard applications, the disposal of the solvent may be performed by removing the cap of a carboy or container, a funnel is inserted and left in the stem of the carboy, and the waste solvent is disposed into the carboy using the funnel. When the carboy is filled, the carboy is capped and the container is then transferred to an approved disposal, recycling, or incineration facility.

This system of disposal has several significant environmental disadvantages. Among others, the solvent present in the carboy is left exposed and open to the atmosphere because the stem funnel is not sealingly secured, the stem funnel passes through the stem of the carboy and is open to the atmosphere. Thus the volatile solvent or solvent mixtures evaporate and contaminate the local environment and atmosphere. The high rate of evaporation is further accentuated by the fact that most containers for the disposal of solvents are stored in a ventilated or fume hood, where the high air flow further increases the rate of solvent evaporation.

In a standard application, a typical 8-gallon carboy will usually be filled with waste solvents after a period of several days or weeks, and a considerable amount of solvent will evaporate to the atmosphere over the extended period of time. Even if the carboy was recapped at the end of each day, when the carboy is not in use, a considerable amount of solvent will still evaporate to the atmosphere during the workday when the cap is removed, the funnel is installed, and the patent path was present. Even with the best laboratory practice of diligently recapping the carboy at the end of each work day, even during a typical 8 hours work day, a large amount of undesirable vapor emission is produced even when a standard laboratory funnel is left on the bottle or the carboy.

While it may appear that the contamination of the atmosphere from such evaporation may not be significant, tests have shown that loss of solvents from such evaporation is quite significant. For example, in an 8-liter carboy filled with dichloromethane, 500 ml. (or about 0.663 kg) of this solvent evaporates into the atmosphere via the stem of the funnel in a period of 114 hours (4.75 days). In one study performed by Brian Bateman (Bay Area Air Quality Management District (BAAQMD), Laboratory Building Fume Hood Modeling Study, September 1994), it was demonstrated that each 25,000 square feet of a typical research laboratory space releases enough volatile organic solvents (VOCs) into its atmosphere to (statistically) cause one person per million in the San Francisco Bay Area to contract some form of cancer. In addition, the atmospheric contamination by VOCs has other well known deleterious effects, and may contribute to smog, haze, destruction of the protective ozone layer, etc . . . It has also been shown that localized pollution by VOCs contributes to asthmatic conditions and poor health, in general.

This evaporation and contamination problem and its concomitant deleterious effects can be significantly reduced by not leaving the funnels with their patent stems in carboys when the system is not in use. In order to accomplish this, however, each carboy or solvent container would have to be kept capped and sealed at all times (except during disposing of solvent). When capped in this manner, a researcher or laboratory technician would have to place the container containing the waste solvent to be disposed of on the laboratory bench, remove the cap from the carboy, insert a funnel, dispose of the waste solvent, then remove the funnel and recap the carboy each time the user needs to dispose of waste solvents. Because of the multiple steps involved in this effort to dispose of waste solvents, experience has shown that laboratory personnel will be simply not performed these arduous steps for disposing solvents through out the day. Instead the user will tend to leave the carboy open with the funnel inserted at all times during the day and over the work week, thereby contaminating the atmosphere through solvent evaporation.

In addition to the above problems, the addition of solvent to a container using a standard funnel often results in liquid pulsations or burps that may result from the differential pressure between the environment and the inside pressure of the container as increasing volume of solvent is added to the container. In addition, as solvent is added, the solvent entering the container must share the same pathway with the displaced air that is venting out of the container. One way to eliminate such pulsation or burping is by the careful transfer of solvent such that the funnel path never floods or occludes the escaping or venting air. However, this method requires a slow addition of solvent and a significant amount of operator skill that is rather difficult and unmanageable at all times, particularly when the disposal of viscous liquids are performed.

U.S. Pat. No. 5,676,185 (1997) to Starr et al discloses a vented funnel for a closed head hazardous waste container. The patent claims a drum coupling that is connected to the funnel body and does not disclose coupling mechanism for laboratory containers nor does the patent teach any methods for safely transferring solvents to prevent overfill.

Ravishankar, in U.S. Pat. No. 4,803,946 (1989), discloses a funnel with a long drain stem which extends into the liquid solvent in the collection tank below the funnel. This results in reduced buildup of solvent on the walls of the tank. However the top of the funnel is still left exposed, so that solvent can evaporate through the stem of the funnel into the atmosphere.

U.S. Pat. No. 5,033,520 to Kuehmichel (1991) discloses a large metal drum with a top funnel having an offset stem which is inserted into a bung opening in the top of the drum. Solvent can evaporate into the atmosphere via such stem, which is patent. The drum has a top cover, but this must be removed with the funnel is installed.

Offenlegungschrift DE 39 36 099 A1 to Kuehmichel (published 1991) discloses a drum with a long-stemmed funnel which extends into the liquid in the drum. This arrangement also suffers from the same disadvantages of solvent evaporation as noted above.

Europaische Patentanmeldung 0 582 126 A1 to Recycling-Chemie-Niederrhein (published 1993) shows a similar funnel and drum arrangement with the same disadvantages.

A laboratories supplies catalog from Scienceware by VWR Scientific, West Chester, Pa. (1994) shows, on pp. 18 and 38, funnels with caps which are hinged to the upper rim of the funnel. The caps can be held stably in either the open (vertically upright) or closed position. This cap will not prevent the evaporation-contamination problem because it does not form an airtight closure on the funnel. Moreover, the funnel lacks an extended stem that extends into the container beyond the neck of the container or lacks a stem that immerses into the liquid. An extended stem or a stem that is immersed into the liquid as liquid is being added to the container significantly reduces solvent evaporation, since the extended stem reduces the available vapor volume only to the volume that is present in the stem as opposed to the larger volume of the head space of the container. In addition, it has been observed that a typical user will tend to leave the cap of the container off after use, thereby losing any and all benefits for containing solvent vapors that the cap could possibly provide. It has been demonstrated that solvent containers with the presence of a larger head space leading to the opening in a particular container that is equipped with a standard funnel will provide a higher rate of solvent loss than a container with a smaller head space leading to the opening of the container.

ASPECTS OF THE INVENTION

Accordingly, the present invention provides an apparatus for the environmentally safe transfer and disposal of solvents, such as waste solvents, and eliminate atmospheric contamination from evaporated solvents. The apparatus may also be used for the transfer of solvents into storage containers for further recycling and re-use. In addition, the apparatus eliminates the multiple steps and tedious procedures that are typically required for transferring solvent into storage or waste containers for storage and disposal. Typically, the procedure include manually opening a solvent storage container or carboy, locating, installing and stabilizing a funnel over the container, transfer of the solvent, removal of the funnel after transfer, storing the wet and contaminated funnel in a convenient and safe location, and re-closing the container. The unacceptable alternative to this procedure is to simply leave the funnel on the container for further use at another time.

In another aspect, the invention provides an ecologically friendly funnel apparatus that may result in the reduction in the incidence of cancer or illness, and other deleterious local and global environmental pollution (such as smog, haze, unbluing of the sky, asthmatic conditions, destruction of the protective ozone layer, etc.) that are associated with undesired solvent loss through evaporation.

In another aspect of the invention, the funnel apparatus simplifies the typical procedures associated with the transfer and disposal of solvents into storage containers by eliminating the need for the repetitive handling and installing the funnel over the container, and also for recapping the storage containers after each use.

In another aspect of the invention, the funnel thickness and specifically the lid thickness is designed to provide a barrier to solvent or solvent wastes containing beta emitting radio nuclei such as solvents or solvent wastes employed in radio-chemistry when hot isotopes are employed. The funnel of the present invention may be manufactured from a material that minimizes or prevents radiative emission during storage, or the funnel may be coated or lined internally and/or externally with a material that minimizes or prevents radiative emission during storage.

In one embodiment, there is provided an ecological funnel apparatus for use with a solvent container, comprising:

(a) a funnel having a conical, tapered body portion having a relatively wide open upper end and a relatively narrow lower end defining an internal passage therethrough, the funnel comprising means for displacing air and configured to extend from a position within the upper end of the funnel through the stem of the funnel, and (b) an adaptor for adapting the funnel and the solvent container, the adaptor comprising, (i) an upper portion configured for mounting and seating the funnel to the adaptor, (ii) a lower portion for inserting into the solvent container and mounting the adaptor onto the solvent container, wherein the lower portion comprises a terminal extension that extends into the solvent container by a length sufficient to preserve an air reserve volume in the container that is equal to or greater than a maximum fill volume of the funnel body, (iii) an internal passage extending from the upper portion of the adaptor to the lower portion of the adaptor through the terminal extension, wherein the internal passage is in fluid communication with the means for displacing air, the internal passage of the conical body and the terminal opening of the adaptor, and (iv) a coupling mechanism attached to the adaptor for securely mounting the adaptor to the solvent container to form an airtight seal.

In one variation of the above embodiment, the means for displacing air comprises at least one ventilation line or an unobstructed pathway configured to direct liquid away from displaced air. In another variation, the ventilation line having an upper end and a lower end, the upper end extending into the funnel body and the lower end extending into the adaptor.

In one variation, the funnel apparatus further comprises a closure cap attached to the upper end of the funnel body, the cap having a top face and a bottom convex face, wherein the cap is configured with the funnel to create a liquid and airtight seal when closed. In another variation, the cap is further configured with a hinge for movement between fully opened and closed positions.

In one variation, the funnel apparatus further comprises a filter mounted in the body of the funnel.

In another variation, the lower portion of the adaptor is configured to securely fit and engage the opening of the solvent container to form an airtight seal.

In one particular variation, the lower portion comprising the terminal extension is cylindrical and the diameter of the internal passage at the lower portion of the adaptor is substantially the same size as the diameter of the internal passage at the top of the adaptor. In another variation of the above, the diameter of the internal passage at the lower portion of the adaptor is larger or smaller than the diameter of the internal passage at the top of the adaptor.

In yet another variation, the closure cap further comprises a latch for locking the cap to the funnel. In still another variation, the closure cap is attached to the body of the funnel with a multi-angle adjustable, dual hinge mechanism.

In one particular embodiment, the upper portion of the adaptor is attached to the funnel by an attachment selected from the group consisting of ring clamps or annular clamps, latches, threaded engagement, threaded locking collar connectors with circumferential grooves or threads, or tightening screws. In one variation of the above, the adaptor is coupled by threaded engagement with the funnel to form an airtight seal.

In another embodiment of the invention, the funnel and the adaptor are of unitary construction.

In yet another embodiment, the coupling mechanism is selected from the group consisting of ring clamps or annular clamps, threaded engagement, threaded locking collar connectors with circumferential grooves or threads, tightening screws, latches, securing mechanisms, tightening or adjustable bolts or bands, adjustable compression buckles or straps, quick release ratchet buckles, straps or lever. In one variation of the above embodiment, the coupling mechanism further comprises a sealing O-ring. In another variation, the funnel apparatus include locking means for locking the adaptor to the solvent container.

In another embodiment, the funnel apparatus is made from chemically resistant or inert material. In one variation, the chemically resistant material is HDPE, Polyprolylene, stainless steel, or Teflon.

In another embodiment, the adaptor is configured to be adapted to a solvent container and adapted such that the opening lip at the upper end of the funnel is parallel with the ground.

In another embodiment, the funnel apparatus further comprises a flame arrestor mounted in the funnel.

In another embodiment, there is provided an ecological funnel apparatus for use with a solvent container, comprising:
(a) a funnel having a conical, tapered body portion having a relatively wide open upper end and a relatively narrow lower end defining an internal passage therethrough, the funnel comprising means for displacing air and configured to extend from a position within the upper end of the funnel through the stem of the funnel, and
(b) an adaptor for adapting the funnel and the solvent container, the adaptor comprising, an upper portion configured for mounting and seating the funnel to the adaptor, a lower portion for inserting into the solvent container and mounting the adaptor onto the solvent container, wherein the lower portion comprises a terminal extension that extends into the solvent container by a length sufficient to preserve an air reserve volume in the container that is equal to or greater than a maximum fill volume of the funnel body, an internal passage extending from the upper portion of the adaptor to the lower portion of the adaptor through the terminal extension, wherein the internal passage is in fluid communication with the means for displacing air, the internal passage of the conical body and the terminal opening of the adaptor, and a coupling mechanism attached to the adaptor for securely mounting the adaptor to the solvent container to form an airtight seal; and
(c) a solvent container selected from the group consisting of carboys, JUSTRITE containers, EAGLE containers, Pig Corporation containers, Protectoseal containers, glass or HDPE containers, various solvent disposal containers made form high density polyethylene (HDPE) or polypropylene materials, or drums.

In yet another embodiment, there is provided an ecological funnel apparatus for use with a solvent container, comprising:
(a) a funnel having a conical, tapered body portion having a relatively wide open upper end and a relatively narrow lower end defining an internal passage therethrough, the funnel comprising means for displacing air and configured to extend from a position within the upper end of the funnel through the stem of the funnel, and
(b) an adaptor for adapting the funnel and the solvent container, the adaptor comprising, an upper portion configured for mounting and seating the funnel to the adaptor, a lower portion for inserting into the solvent container and mounting the adaptor onto the solvent container, wherein the lower portion comprises a terminal extension that extends into the solvent container by a length sufficient to preserve an air reserve volume in the container that is equal to or greater than a maximum fill volume of the funnel body, an internal passage extending from the upper portion of the adaptor to the lower portion of the adaptor through the terminal extension, wherein the internal passage is in fluid communication with the means for displacing air, the internal passage of the conical body and the terminal opening of the adaptor, and a coupling mechanism attached to the adaptor for securely mounting the adaptor to the solvent container to form an airtight seal; wherein the funnel and adaptor are formed from a single mold.

In one variation of the above embodiment, the funnel apparatus further comprises a filter mounted in the funnel body.

In one variation of the above embodiments, there is provided one or more markings in the funnel body to indicate a maximum fill volume for filling solvents in the funnel during use.

In another variation of each of the above embodiments and variations, the hinge is adjustable and allows the closure cap to be adjustable for movement between a fully opened, one or more intermediate positions, and the closed position. In another variation, the fire suppressor or flame arrestor may be mounted in the stem of the funnel, or in the upper, middle or lower portion of the adaptor.

In yet another variation of each of the above, the hinge is adjustable and allows the closure cap to be adjustable for movement between a fully opened, one or more intermediate positions, and the closed position.

Further objects and advantages will become apparent from a consideration of the ensuing description and the accompanying drawings.

DRAWING FIGURES

DRAWING REFERENCE NUMERALS

| Number | Description |
|---|---|
| 10 | Funnel |
| 12 | Funnel body |
| 14 | Stem |
| 16 | Neck |
| 16n | Carboy |
| 18 | Solvent |
| 20 | Funnel Apparatus |
| 21 | Closure cap |
| 22 | Funnel, internal passage |
| 23 | Ventilation line |
| 24 | Cap, top face |
| 25 | Cap, bottom face |
| 26 | Adaptor |
| 27 | Adaptor, upper portion |
| 28 | Adaptor, lower portion |
| 29 | Adaptor, internal passage |
| 30 | Coupling mechanism |
| 31 | Solvent container |
| 32 | Filter Unit |
| 33 | Filter vent line |
| 34 | Filter vent opening |
| 35 | Filter screen |
| 36 | Supporting member, filter |
| 37 | Ventilation line opening |
| 38 | Flange, cap |
| 39 | Terminal extension |
| 40 | Funnel stem |
| 41 | Stem collar |
| 42 | Seat collar |
| 43 | Screw hole support |
| 44 | Terminal vent opening, adaptor |
| 45 | Closure latch |
| 46 | Center dome |
| 47 | Hinge |
| 48 | Ventilation line opening |
| 49 | Maximum liquid level |
| 50 | Liquid fill flow pathway |
| 51 | Air ventilation pathway |
| 52 | Liquid fill level-full |
| 53 | Air reservoir |

SUMMARY

In accordance with the invention, an ecologically friendly funnel apparatus has been designed to facilitate the transfer or disposal of solvent to storage containers, minimize the evaporation of solvents during use and during storage, prevents the uncontrolled backflow of solvent vapors, and provides a mechanism for informing the user of the fill level, and provides a simple method for eliminating the inadvertent overfill of solvent during use.

Figure 2:
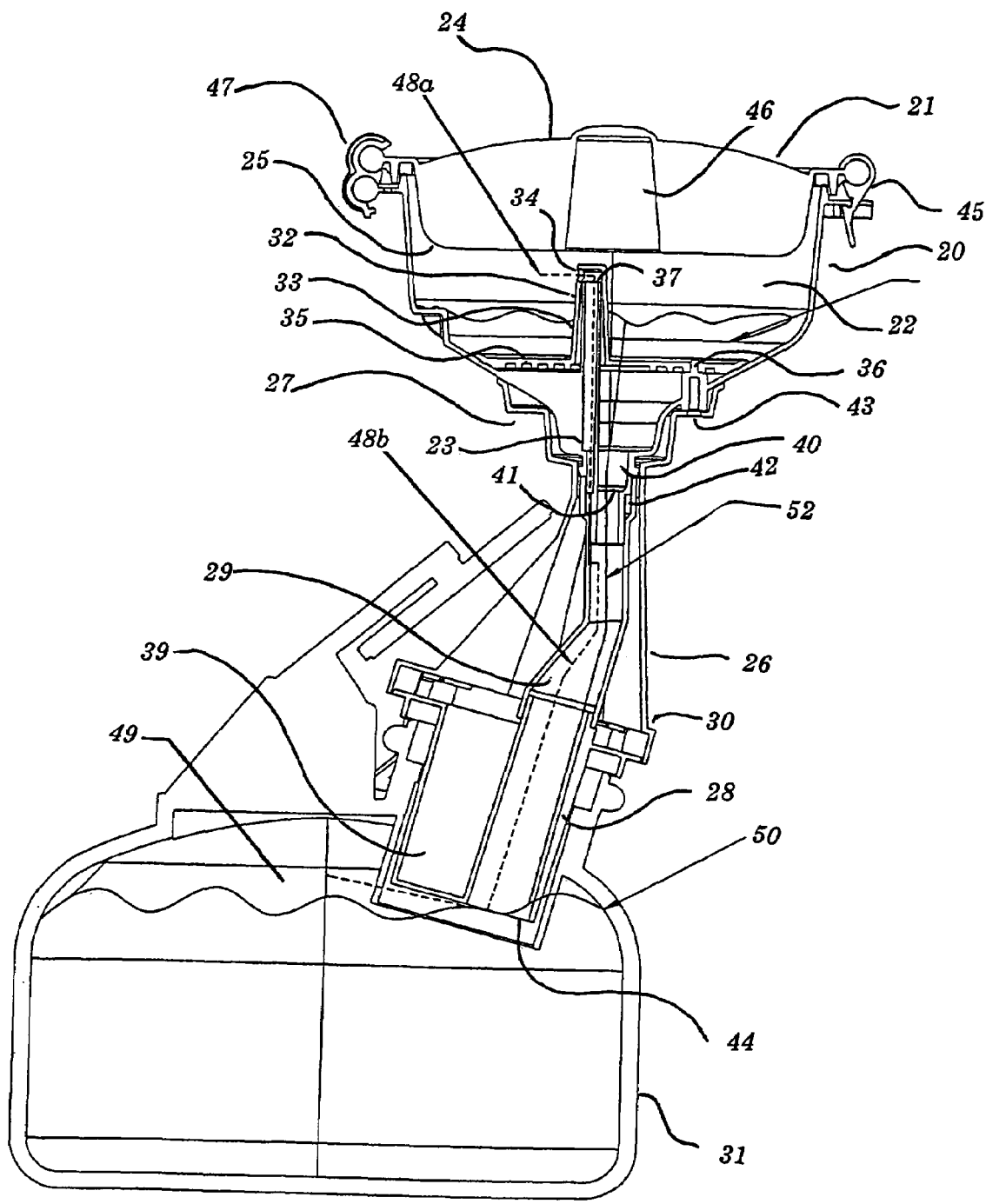
FIG. 2 is a view, in cross section, illustrating features of the ecological funnel apparatus mounted on a solvent container, the funnel having a funnel body, ventilation line, filter, funnel stem, a closure cap, and an adaptor in accordance with the invention.

FIG. 2 is a view, in cross section, illustrating features of the funnel. The funnel apparatus comprises a funnel 20 having a conical body, an internal passage 22 for receiving solvent and also for displacing air in conjunction with a ventilation line 23 for self venting during use, closure cap 21 to minimize solvent evaporation when the funnel is not in use, the closure cap comprising a top face 24 and a convex bottom face 25, an adaptor 26 comprising an upper portion 27 to attach and seat the funnel by the stem 40 of the funnel to the adaptor, a lower portion 28 of the adaptor for inserting the adaptor into the solvent container, an internal passage 29 of the adaptor for receiving solvent flow and displacing return air, and a coupling mechanism 30 to couple and attach the adaptor 26 onto a solvent container to form an airtight seal.

The ventilation line 23 extending into the funnel body may be optionally stabilized with one or more fins (not shown) or support member joined with the inner wall of the funnel to stabilize the ventilation line. In one aspect of the invention, the ventilation line 23 may be substantially vertical, comprises a top ventilation line opening 37 and may vent vertically where the opening of the vent line directs the displaced or vented air straight up the vent line.

Optionally, a filter unit 32 for collecting and filtering solid particles comprising a filter vent line stem 33 with a filter vent opening 34 and a filter screen 35 may be installed over the ventilation line 23. The filter unit 32 may be stabilized and mounted over the ventilation line 23 and supported by at least one supporting member 36, preferably two or three supporting members. When the filter unit 32 seats on the supporting member(s) 36 with the filter vent line stem 33 placed as a fitted sleeve over the ventilation line 23, the filter unit 32 is situated above the top ventilation line opening 37 of the ventilation line 23 at a height above the top ventilation line opening 37 sufficient to allow air to vent during the addition of solvent to the solvent container 31. The vented air may be directed away from the user by one or more filter vent opening 34 placed at the side of the filter vent line stem 33 as is described herein.

In another embodiment, when a filter unit 32 is not employed, the ventilation line 23 may be sealed at the top of the line, (that is, lacking a ventilation line opening 37 at the top) but the ventilation line may have one or more ventilation openings or orifices (not shown) at the side of the ventilation line. The ventilation openings may be placed near the top of the ventilation line so that the openings are not blocked by solvent or solid particles when the solvent is being poured into the funnel.

In one aspect of the invention, the filter vent opening 34 is vented substantially laterally toward the interior wall of the funnel during operation such that any solvent stream or solvent mist expelled from the vent line is directed away from the user, and the solvent may be returned back to the funnel into the solvent container. In another aspect of the invention, one or more filter vent openings 34 may be directed in various angles down or away from the user. In another aspect, one or more filter vent openings 34 may be configured in various size, shapes, or configuration and may further include a screen (not shown) to minimize uncontrolled splashing or spitting of solvent.

Figure 3:
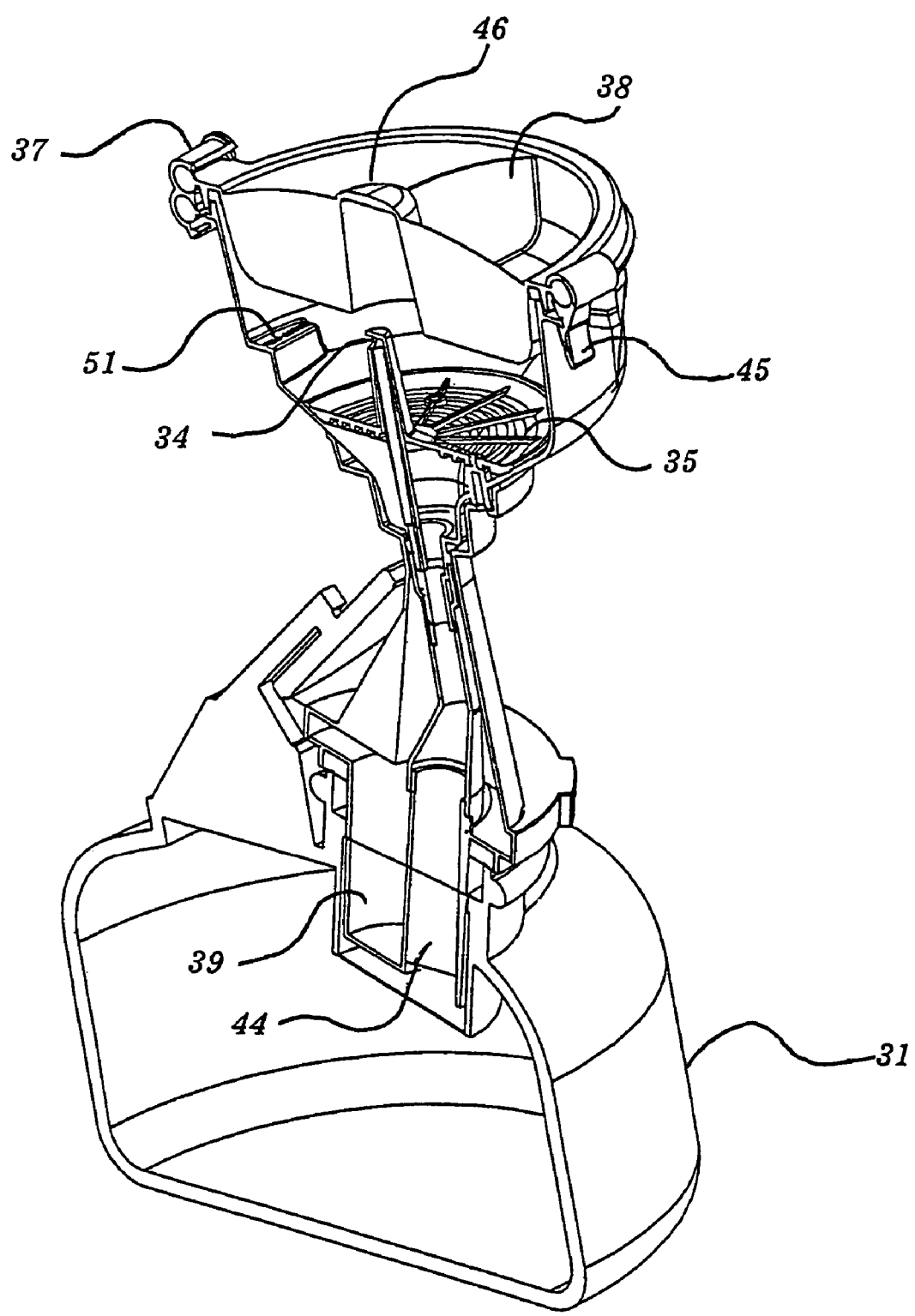
FIG. 3 is a partial cross section perspective view illustrating features of the ecological funnel apparatus mounted on a solvent container, the funnel having a funnel body, a ventilation line, a filter, a funnel stem, a closure cap with a center dome and flanges, and an adaptor in accordance with the invention.

As shown in FIGS. 2 and 3, the solvent container 31 is a JUSTRITE or similarly configured solvent disposal container.

Figure 1:
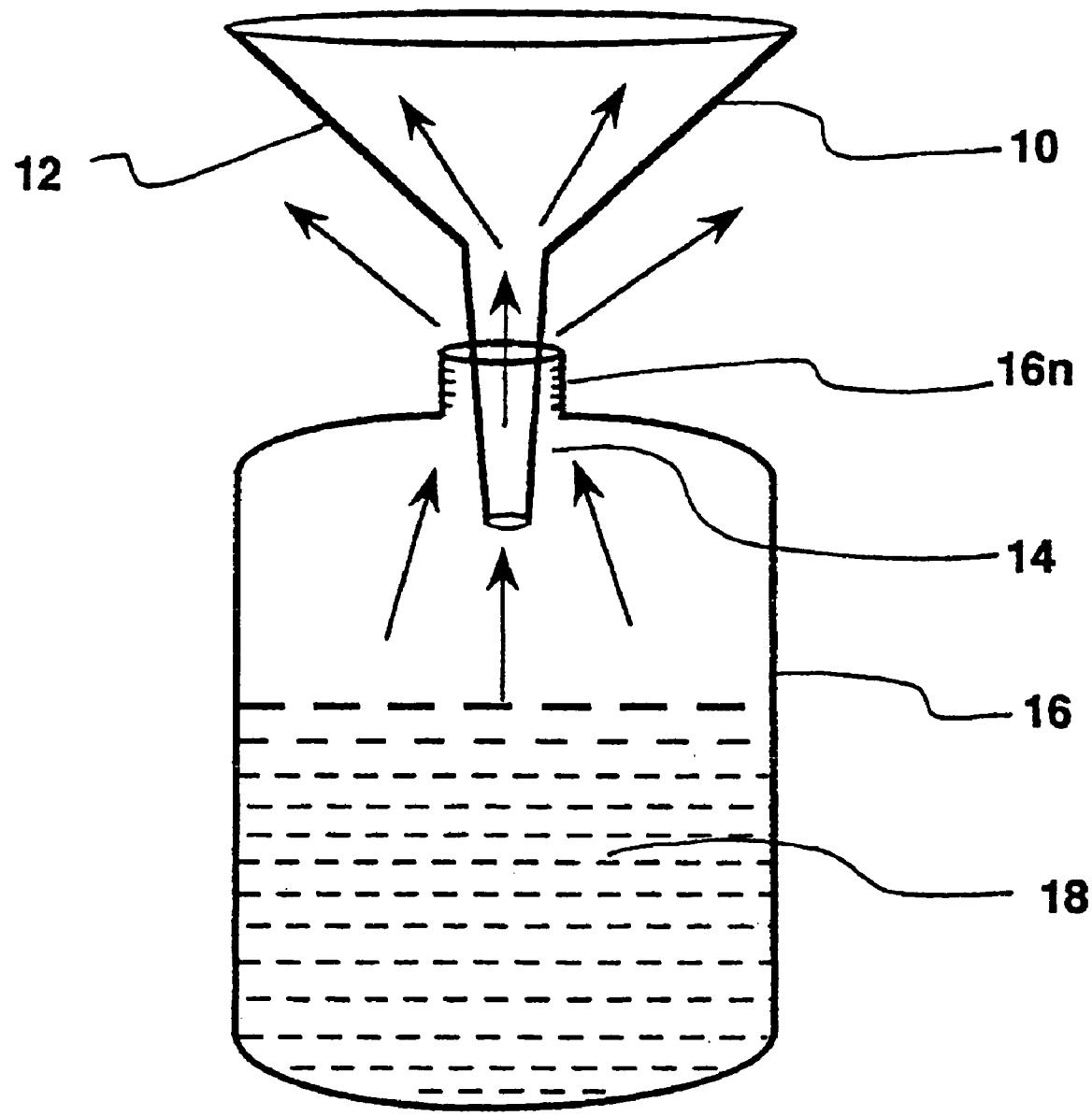
FIG. 1 is a view, partially in cross section, of a prior-art carboy and funnel.

Description and Operation—FIG. 1—Prior-Art Funnel with Carboy

FIG. 1 shows a typical prior-art funnel 10 having a body 12 and a stem 14 inserted into a neck 16n of a conventional carboy 16 which contains a quantity of solvent 18. Solvent 18 may be collected for disposal, recycling, incineration, or any other purpose. Funnel 10 and carboy 16 are typically made from polyethylene, polypropylene, nylon, glass, or stainless steel. Carboy 16 typically has a capacity of 10 to 100 liters and funnel 10 usually has a top diameter of 20 to 250 cm, a height of 20 to 80 cm, and a stem outer diameter of 22 to 35 mm.

Referring to FIG. 1 for a typical operation for the disposal of solvents using a funnel, at irregular intervals, personnel in a laboratory or other facility will dispose or empty quantities of solvent or solvent mixtures from flasks or other containers into the open upper end of body 12 of funnel 10 so that the solvent will flow by gravity through stem 14 into carboy 18. The funnel is typically left on the carboy or container until the container is filled. When the container is filled, the user then removes the funnel, recap the container, and send the container our for disposal, recycling, etc.

The disadvantages of the system of FIG. 1 are described above. That is, solvent 18 will tend to evaporate from within the large surface area of the solvent surface and the head space of the container, which has a relatively large surface and volume for evaporation especially when the container is not completely filled. The solvent vapor flows upward via (a) the lumen of stem 14 and body 12, and (b) the annular space between the inside of neck 16n and around stem 14. The solvent vapor escapes from the container and contaminates the immediate environment and the atmosphere. Such evaporation can be reduced by providing a funnel 10 with a hinged cap. Typical funnels having such closure caps are commercially available. Oftentimes however, the user will accidentally overfill the solvent container and solvent waste will overflow out of the container because the user is unable to accurately view or gauge the level of solvent in the container.

In practice, the use of these commercially available funnels with attached caps is cumbersome and tedious because it requires the manual uncapping of the solvent container, locating of a suitable funnel for the container, installing the funnel over the solvent container, disposal of the solvent, removal and storing the contaminated funnel, and recapping of the container with each and every use by each user.

Also, even when capped, solvents will still evaporate through the cap's seal, which is not typically designed to be airtight. The amount of solvent evaporation can be significant and quite harmful, as noted above. The amount of solvent evaporation and lost into the atmosphere will depend upon the volatility of the solvent, the size of the carboy or container, the fit of the funnel over the container, the inner diameter of stem 14, and the extent of localized air convection. For containers stored in a ventilation hood, there is a significant amount of air currents that increase the evaporation rate of the solvents from the containers.

With the increase in the use of industrial solvents for semiconductors manufacture, biotechnology research and development laboratories for the development of drugs, plastic research and manufacturing, etc . . . , contamination of the atmosphere, for example, by the use of outdated and inefficient funnel apparatus for the transfer of solvents is becoming increasingly significant, and will continue to be a major contributing factor to the cause of cancers, asthma, and other human diseases.

Therefore, there is a need for an ecologically friendly funnel apparatus for the safe and environmentally friendly method for the transfer of solvents for storage and disposal.

Description—FIGS. 2 and 3—Funnel with Adaptor and Cap

In the description which follows, like parts are marked throughout the specification and the drawings with the same respective reference numerals. The drawings are not necessarily to scale and in some instances proportions may have been exaggerated in order to more clearly depict certain features of the invention.

In accordance with one embodiment of the invention as shown in FIGS. 2 and 3, a funnel apparatus comprises a funnel 20 having a substantially conical body or housing with a wide opening at the top of the funnel that is sufficiently wide to facilitate the ease and unobstructed transfer of the solvent by a user, a funnel body mid-section and a tapered body portion to a relatively narrow lower funnel stem 40. The funnel comprises the funnel body with an internal passage 22 of appropriate size for use with a disposal container 31 and for receiving solvent. In one variation, the internal passage 22 also allows the unobstructed displacement of return air or vented air in conjunction with or in operation with a ventilation line 23.

When solvents are added into the funnel, return or vented air that is displaced by the added solvent may either be displaced by returning up from the internal passage 22 in the case where a small amount of solvent is added to the funnel. When a large amount of solvent is added to the funnel such that the internal passage is flooded or occluded and prevents the escape of the displaced air directly up the internal passage 22, then the displace air may escape through the ventilation line 23. The presence of the ventilation line 23 controls the steady flow of solvent and provides an independent vent pathway for escaping air and eliminates the potentially hazardous occurrence of solvent backup, spitting or burping out of the funnel and/or back at the user. In normal operations, the displaced air may vent through either the internal passage 22, through the ventilation line 23 and out the top ventilation line opening 37, or through both pathways. The pathway for vented air or displaced air is shown as a dotted line in FIG. 2.

The apparatus may also comprise a closure cap 21 to minimize or eliminate solvent evaporation when the funnel is not in use. When in use, the closure cap 21 may be opened and may remain in an open and unobstructed position during use. Upon the complete transfer of solvent, the user may readily close the cap and, optionally lock the cap for an air and liquid tight seal to prevent any evaporation of solvent and to prevent accidental spillage of the container content should the apparatus be accidentally tipped over. A gasket may be placed between the closure cap 21 and the top rim of the funnel 20 to allow an airtight and solvent tight seal when closed.

In the above embodiment, the closure cap 21 requires manual opening or closing. However, where desired, the opening of the closure cap may be configured to be performed by a foot pedal (not shown) as known in the art to operate the lid so that the user may not have to lift it manually, thereby leaving the hands free to dispose the solvent into the funnel. For example, the pedal mechanism may comprise a fulcrum or pivot mounted foot pedal, similar to the type used on trash cans with pedal-operated lids. Such mechanism is described in U.S. Pat. No. 5,515,892 to Najafi and Najafi, the content of which is incorporated herein in its entirety.

In one embodiment, the closure cap comprises a substantially concave top face 24 and a convex bottom face 25, a hinge 40 and a locking or closure latch 41.

In one aspect of the invention, the concave top face 24 may comprise a center dome 42 to accommodate the protruded ventilation line 23 and filter unit 32 when the ventilation line and filter unit is designed to protrude up from the center of the funnel 20. It is noted that where the filter unit and ventilation line may be configured to be aligned and placed in parallel and along the side wall of the funnel (not shown in the Figures), then the center dome may be present or absent. In another aspect of the invention, at least one flange 38 (or support plate) connects the side wall of the top face 24 of the cap with the center dome 42 to provide structural support and form a unique design for the cap of the present invention. Preferably, the concave top face 24 comprises anywhere from three to eight flanges 38 connecting the side wall of the top face with the center dome 42.

In one embodiment, the convex bottom face 25 of the closure cap 21 protrudes and extends into the upper portion of the funnel such that a minimal amount of head space in the funnel is available for solvent evaporation into the funnel when the closure cap 21 is closed. Preferably, in the closed position, the convex bottom face 25 occupies at least 10% of the head space (or bowl) of the funnel body. In another aspect, the convex bottom face occupies at least 50% of the head space of the funnel. In yet another aspect, the convex bottom face occupies at least 85% of the head space. It is noted that the smaller the volume that is available for solvent vapors to occupy in the head space of the funnel body, the lower the rate of solvent evaporation and loss into the atmosphere. Therefore, the funnel of the present invention is designed such as to minimize lost of solvent through evaporation during use and during storage.

Figure 4:
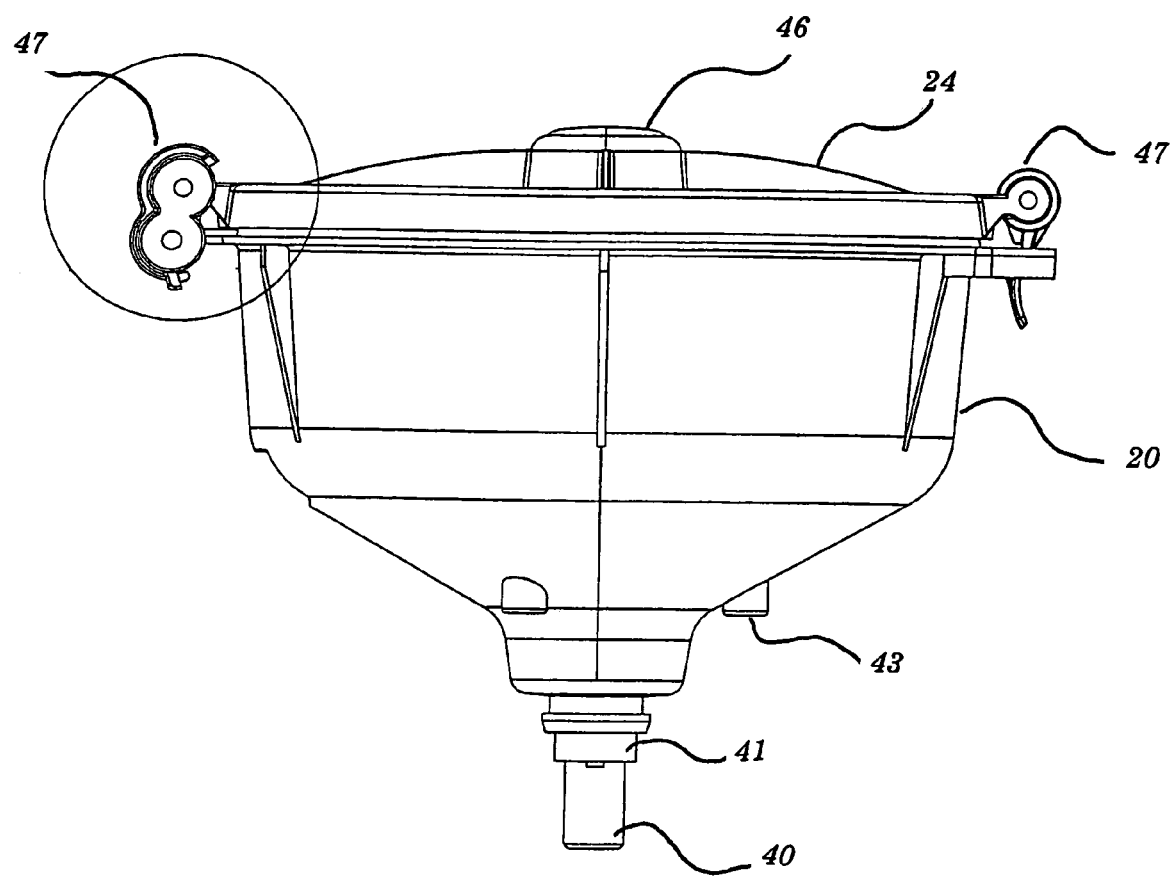
FIG. 4 is a side view illustrating features of the funnel body and closure cap including the center dome, dual hinge, funnel stem, stem collar, and housing for screw holes, in accordance with the invention.
Figure 5:
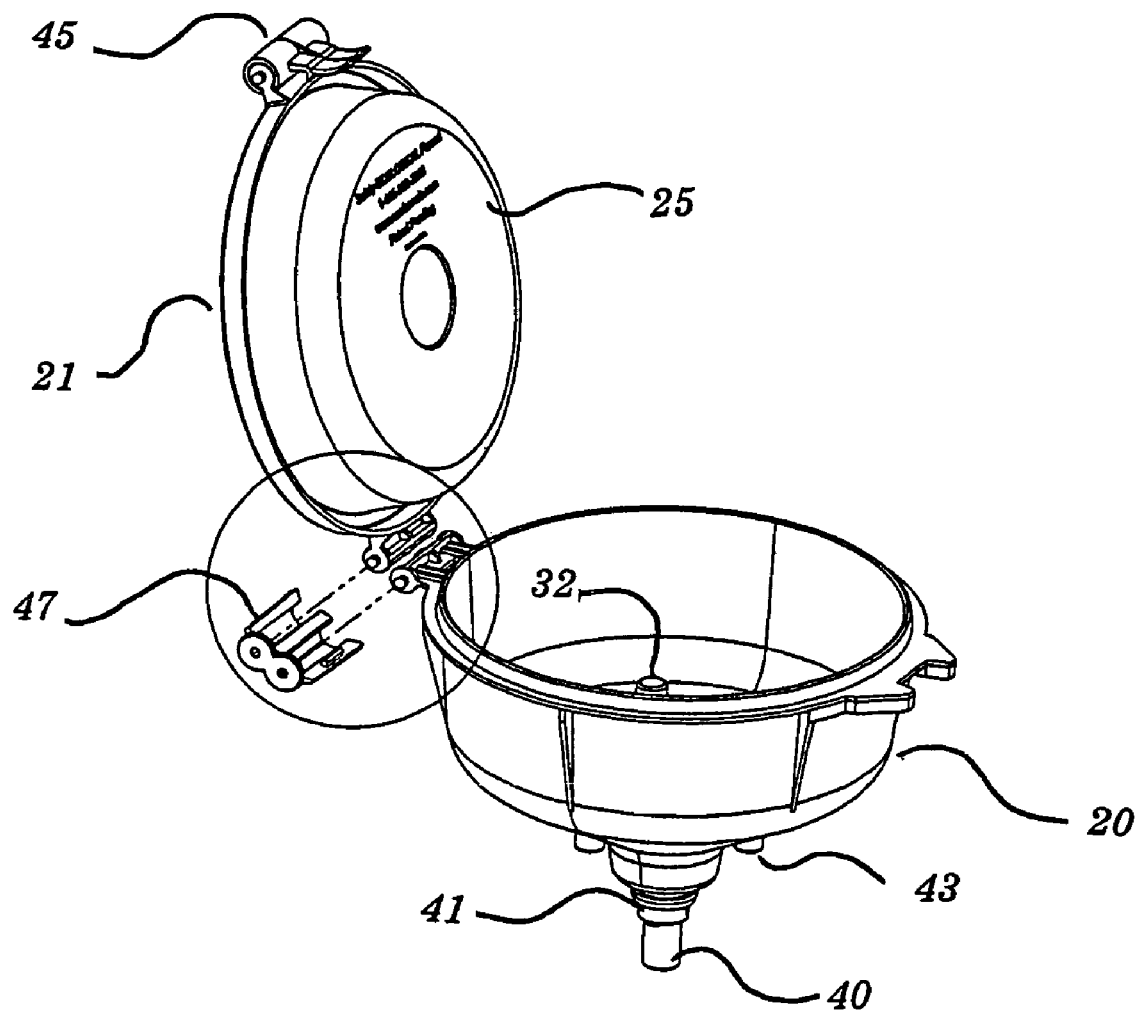
FIG. 5 is a side and perspective view of the funnel body and closure cap of the present invention illustrating the dual hinge, convex bottom face of the closure cap in the opened position, and the funnel stem in accordance with the invention.

In one aspect of the invention, the hinge 40 is a uniquely designed dual hinge that allows the closure cap 21 to be opened and remain in the open position at one or more designated angle as desired (FIGS. 4 and 5). The removable and re-insertable design of the dual hinge of the present invention allows the user to maintain the closure cap 21 open at one or more different angles of opening. When the hinge is inserted into one configuration, when opened, the closure cap remains opened at an angle greater than 100 degrees. Where the angle of opening is greater than 100 degrees, the closure cap is displace out of the way and does not interfere with the user during the disposal of the solvent. When the hinge is inserted in the second configuration, the closure cap 21 will open less than 90 degrees. In this second configuration, by gravity, the closure cap will automatically close after use in case the user neglects to close the closure cap after use. In one aspect of the invention, the closure cap in the closed position is airtight and liquid tight.

The ventilation line 23 extending into the funnel and down through the funnel stem 40 may be optionally stabilized with one or more fins (not shown) or support member that is joined with the inner wall of the funnel to stabilize the ventilation line. The elongated ventilation line 23 may be located and may extend from any location in the upper portion inside the funnel body and terminate at any point within the funnel stem 40, the upper portion of the adaptor 27, or the lower portion of the adaptor 28, as long as the opening of the terminal end of the ventilation line is placed in a location that will not be obstructed by solvent while solvent is added to the funnel. In one variation of the invention, the lower opening of the ventilation line terminates with an opening in the funnel stem 40. In another variation, the lower opening of the ventilation line terminates with an opening in the lower portion of the adaptor 28. In another variation, the ventilation line terminates with an opening at a location in the middle portion of the adaptor 26.

In another variation, the ventilation line or lines may comprise of one or more distinct air pathways and may be larger in diameter than the ventilation line 23 as illustrated. The ventilation line(s) or pathway(s) may be of appropriate size and configuration such that the addition of solvent to the funnel will not obstruct the concurrent ventilation of air.

In one aspect of the invention, the ventilation line 23 may vent vertically when the opening of the vent line directs the displace air straight up the vent line. Optionally, a filter unit 32 for collecting and filtering solid particles comprising a filter vent line stem 33 with a filter vent opening 34 and a filter screen 35 may be installed over the ventilation line 23.

The filter unit 32 may be mounted and seated over the ventilation line 23 and may be supported by at least one supporting member 36, preferably two or three supporting members. When the filter unit 32 seats on the supporting member(s) 36, the filter unit 32 with the filter unit vent line stem 33 is elevated above the filter vent opening 34 of the ventilation line 23 sufficient to allow air to vent during the addition of solvent into the funnel to the solvent container 31. In one aspect of the invention, the filter unit 32 comprises at least one filter vent opening 34 that may direct any solvent vent or spray to be directed laterally or down and away from the user. In yet another aspect, one or more filter vent opening 34 may have a screen or filter element (not shown) to further minimize any solvent spray from the venting air.

The removable filter unit 32 allows the user to remove and clean out the filter and any blockage of the ventilation line 23 as needed. The filter screen 35 may be designed in various different configuration and screen-mesh size to trap solid particulates such as metal catalyst, stir bars, polymeric tars, etc . . . The filter screen 35 may be made from various non-corrosive and non-flammable material as is known or used in the art. In one aspect, the filter unit and screen may be made from the same material as the funnel 20. In another aspect of the invention, where desired, the screen may contain a magnetic metal element (not shown) to collect and trap metals and small stir bars.

In another embodiment, the filter unit 32 may be a permanent fixture in the funnel and may be manufactured or formed as an integral part of the funnel. The filter unit may be joined or connected either to the side wall of the funnel, or may be stabilized and supported by permanent members attaching the filter unit to the base of the funnel, or both.

In another aspect of the invention, the filter vent opening 34 is configured to allow venting that is substantially laterally toward the interior wall of the funnel such that any solvent stream or solvent mist from the vent line is directed away from the user, and the solvent may be returned back to the funnel. In another aspect of the invention, the filter vent opening 34 may be directed at various angles down or away from the user. In another aspect, the filter vent opening 34 may be configured in various size, shapes, or configuration and may further include a screen (not shown) to minimize uncontrolled splashing or spitting of solvent.

In another aspect of the invention, the ventilation line 23 and connected filter vent line stem 33 may be designed to run adjacent to and aligned (or incorporated) within the curvature of the side wall of the funnel such that the top of the ventilation line and connected filter vent line (not shown) forms part of the wall of the funnel 20.

In another aspect of the invention, one or more markings may be incorporated on the inside wall of the funnel to indicate to a user the recommended maximum solvent fill level in the funnel body during use such that the funnel may be safely operated without the risk of overflow. See below.

In one embodiment as shown, the stem of the funnel 40 comprises at least one stem collar 41 that extends down and seats on the mating seat collar 42 on the wall of the internal passage of the upper portion of the adaptor 27. While mating of the stem collar 41 with the seat collar 42 allows the funnel 20 to couple and seat firmly with the adaptor 26, various methods and embodiments are known in the art for joining or connecting similar components together to form a stable connection. For example, the connection may include internal or external plastic welds, tightening bands, tightening screws, threaded locking collar connectors with circumferential grooves or threads, or combination thereof. In one particular embodiment of the invention, the funnel 20 is connected to the adaptor 27 using three screws and screw holes 43, as shown in FIG. 2.

The ventilation line 23 may be coaxially disposed with the funnel stem 40. The ventilation line 23 may extend from about midway from the inside of the bowl or body of the funnel down into the collar of the stem 41. The ventilation line may also extend down into the top portion of the stem 41 or may extend to the tip or lower portion of the stem 41. Optionally, the ventilation line may extend further down beyond the top portion of the stem 41 all the way to the lower portion of the adaptor 28. In one particular embodiment of the invention as illustrated in FIG. 2, the ventilation line extends down to about 2.5 cm or more from the tip of the stem 41.

In another particular embodiment as substantially illustrated in the FIG. 2, the end or lower portion of the ventilation line terminates at a position opposite or away from the natural or internal passage directed gravitational flow of the solvent from the funnel 20 through the adaptor 26 into the solvent container 31. The lower portion or end of the ventilation line 23 in the adaptor may be placed anywhere along the adaptor 26 as long as the down flow direction of the solvent flow does not block, occlude or interfere with the pathway for the venting of air or solvent vapors (shown as dotted line in FIG. 2) from the container and funnel apparatus.

Minimizing the potential blockage or occlusion of the ventilation line during the use of the funnel may be accomplished in a variety of different ways. In addition to such an angular adaptor configuration as substantially shown in FIG. 2, the adaptor may be designed in various shapes and configurations as long as the flow of incoming solvent being added to the funnel is regulated or directed away from the ventilation line, or does not interfere with the ventilation process. Examples of such design or configurations in the internal passage of the adaptor 29 include the use of one or more shields, plates or baffles at the opening of the vent line to prevent solvent from blocking the vent line during addition of solvent to the funnel. In addition, the use of directional reflectors, plates, flanges with peripheral channels, baffles or guides that may be placed in the internal passage of the adaptor 29 to regulate, deflect or direct the flow of solvent away from the vent line opening at the lower portion of the ventilation line to allow the unobstructed venting of air or solvent vapors. Such internal passages may include concentric tubes incorporated into the funnel and adaptor to form annular air space.

Figure 6:
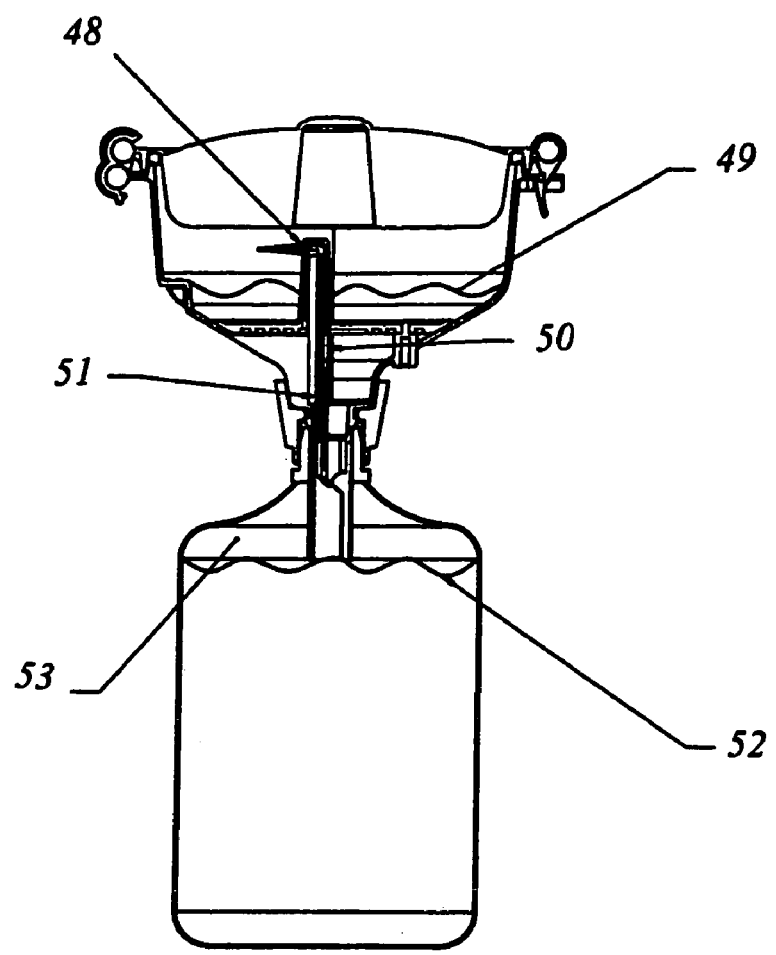
FIG. 6 is a side view illustrating features of another embodiment of the funnel body having a vertical adaptor, closure cap, and carboy, illustrating liquid fill level and reserved air in carboy.
Figure 7:
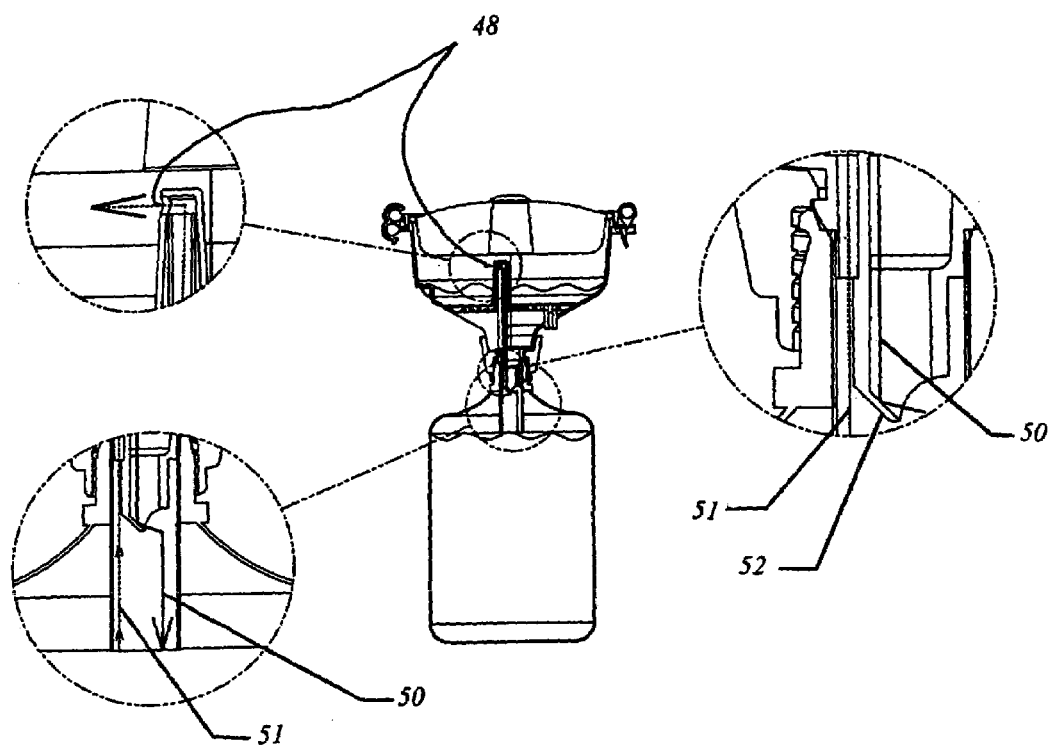
FIG. 7 is a side view illustrating features of another embodiment of the funnel body having a vertical adaptor, closure cap, and carboy illustrating close up view views of the air ventilation path and liquid fill flow pathway.

In one embodiment, as illustrated in FIGS. 6 and 7, the deflection of liquid flow away from the air ventilation line or pathway may be by means of a deflector or baffle.

In another variation, the narrow end of the funnel body, the funnel stem 40 and/or the adaptor 26 may be configured with an internal passage that is directional, angular or helical in form such that added solvent flow is directed or guided down the funnel inducing a vortex flowing action that creates and maintains a ventilation air path within the vortex in the solvent stream for escaping gas. It is noted that where a vortex is formed during the addition of solvent, the funnel will not flood and occlude the venting of air. In another variation, the configuration of the walls of the internal passage of the adaptor may be constructed and configured such that the wall may preferentially direct solvent flow at a particular side or sides of the internal passage, and may optionally further form vortex solvent flow that is directed away from the opening of the ventilation line to allow the escape of venting air.

In each of the above variations, a combination of one or more ventilation lines in conjunction with the use of reflectors, plates, baffles or the helical designed construction of the internal passages for directing the flow of solvents may be used for the disposal of viscous solvents without risk of flooding or blocking of the ventilation line. It should be noted that the design of the funnel of the present invention provides a significant advantage to funnels that are commercially available, in part because there is very little risk for blockage, pulsation or burping of solvent back at the user during disposal of solvent or solvent waste.

The funnel apparatus further comprises an adaptor 26 for adapting the funnel 20 with the solvent container 31. The adaptor comprises a upper portion 27 that is configured to attach and seat the funnel to the adaptor by way of seating the stem collar 41 on the seat collar 42, a lower portion of the adaptor 28 of the adaptor for inserting the adaptor into the solvent container 31, an internal passage 29 of the adaptor for receiving solvent flow and accommodating the displaced return air, and a coupling mechanism 30 to couple and seat the adaptor onto the solvent container to form an airtight and liquid tight seal.

The upper portion of the adaptor 27 comprises an internal passage 29 that is in fluid communication with the internal passage of the funnel 22 and extend out to the lower portion of the adaptor 28 and the terminal extension 39 into the interior of the solvent container 31.

The lower portion of the adaptor terminates with a terminal extension 39. When the funnel apparatus is mounted on a solvent container, the terminal extension 39 fits in the opening of the solvent container 31 and extends into the solvent container. The terminal extension 39 protrudes at a pre-determined distance into the opening of the solvent container and operates as a solvent level indicator informing the user when the solvent container is nearly full (see TALLI system description below).

As illustrated in FIGS. 2 and 3, in one embodiment of the present invention, the terminal extension 39 is substantially cylindrical, houses the terminal opening 44, and fits securely into the opening of the solvent container. The terminal opening 44 is shown in FIGS. 2 and 3 to be offset from the center axis of the terminal extension 39 to allow the solvent flow away from the air ventilation pathway. The air ventilation pathway is shown as dotted line in FIG. 2. In another aspect of the invention, the terminal extension 39 may be configured to be formed from a variety of different shapes and dimensions as long as the extension fits and protrudes into the solvent container.

Description—FIGS. 6 and 7—Funnel with Vertical Adaptor and Cap on a Carboy As illustrated in FIGS. 6 and 7, in another embodiment of the present invention, the funnel and adaptor may be configured in a vertical or non-curvilinear configuration wherein the adaptor is substantially vertical. In the particular configuration, a deflector or baffle 52 directs liquid flow away from the air ventilation path 51 such that the air ventilating from the container, adaptor and funnel is not obstructed as the air exits the ventilation line opening 48 while liquid is being added into the carboy or a solvent container.

When the ecological funnel apparatus of the present invention is installed in a solvent container for use, as depicted in FIGS. 2, 3, 6 and 7 the apparatus is mounted or attached onto the lip or rim of the solvent container using a coupling mechanism. The coupling mechanism may be constructed as an integral part of the adaptor or as an independent component. The coupling mechanism may be made of a variety of materials, including the same material molded from the funnel, inert plastics, stainless steel, and the like.

In one particular embodiment, the coupling mechanism comprises of four locking latches or tabs, wherein the coupling of the funnel apparatus to the solvent container forms an airtight and liquid tight seal. In one particular embodiment, a non-reactive gasket may be used for a tight seal.

The mounting of the funnel apparatus of the present invention onto the lip or rim of the solvent container 31 may be secured using a variety of means, such as latches, securing mechanisms, tightening or adjustable bolts or bands, adjustable compression buckles or straps, quick release ratchet buckles, straps or lever (such as those employed in ski boots or snowboard boots and the like), as is known in the art for securing joints of this nature.

In a particular embodiment, the ecological funnel apparatus of the present invention provides a unique safety mechanism that prevent the inadvertent overfill of solvent. In particular, the Trapped Air Liquid Level Indicator System (TALLI System) of the present invention operates in part as a closed system funnel and solvent container. When a user of the apparatus disposes solvents into the funnel, displaced air is vented through an unobstructed pathway, for example, through the ventilation line 23 and up to the top of the funnel. When the liquid level within the solvent container starts to fill in the disposal container and the liquid level rises up to obstruct the terminal opening 44 of the adaptor, in this case, the lower terminal opening 44 sits immediately above the flame arrestor of the solvent disposal container, the blockage of the terminal opening 44 by the rising solvent level prevents air from inside the head space of the disposal container to vent as additional solvent is being added to the solvent container. The trapped air in the head space also referred to herein as the reserve volume of air in the head space of the disposal container.

When the ventilation process is completely blocked, a reserve volume of air will be trapped in the solvent container in the head space and the continued addition of solvent into the funnel by the user will cause the flooding of the air passage and the eventual back up of solvent up into the funnel. The solvent back up and filling of the funnel can be readily seen by the user and will provide notice to the user that the solvent container is nearly full, except for the reserve volume of air.

It should be noted that for applications of the apparatus of the present invention in conjunction with a JUSTRITE solvent disposal container or a similar configured solvent container, the lower tip of the lower portion of the adaptor with the terminal opening 44 extends only as far as the flame arrestor of the JUSTRITE container will allow, thus limiting and determining the maximum volume of reserved air in the head space, and thus corresponding to the volume of solvent that may be collected when the TALLI system indicates that the disposal container is full. For solvent containers wherein the flame arrestors is placed either lower or higher than is shown in the JUSTRITE container in the figure, then the length or the lower tip of the lower portion of the adaptor with the terminal opening 44 may be constructed and made to extend to an accordingly appropriate length to permit optimal and safe use of the ecologically friendly funnel without the risk of spillage. Depending on the size, shape and configuration of a particular solvent container, the length of the lower portion of the adaptor may be designed such that the volume of solvent collected does not overflow during use.

Once the user notes that a pool of solvent is collected in the funnel, the pool of solvent acts as a visual prompt to inform the user to stop adding solvent to the apparatus as the disposal container is now nearly filled except for the reserve volume. The user may then simply loosen (but not remove) the airtight coupling mechanism 30 to break the air lock formed inside the solvent container, releasing and venting some of the air in the head space and allowing the small amount of collected solvent in the funnel to drop down and fill the solvent container without any risk of causing an overflow in the disposal operation. It should be noted that any means for breaking the airtight lock or means for releasing the trapped air in the system as known in the art may be used. Means for releasing air may include a relief valve, a vent port, or the like.

Thus, the ecological friendly funnels having the TALLI system provides, in part, an airtight joint between the adaptor and the disposal container in conjunction with a maximum fill level indicator in the funnel, and prevents the accidental over flow and spillage of solvents during transfer. Furthermore, after using the ecologically friendly funnel apparatus of the present invention, the user may close the lid and latch the closure cap to prevent further escape of solvent into the atmosphere.

As shown in FIGS. 2 and 3, the solvent container 31 is a JUSTRITE or similarly designed solvent disposal container. The ecological funnel apparatus may be used with a variety of solvent containers such as carboy (FIGS. 6 and 7 using a vertical adaptor), JUSTRITE containers, EAGLE containers, Pig Corporation containers, Protectoseal containers, various solvent disposal containers made form high density polyethylene (HDPE) or polypropylene materials and the like.

The ecological funnel apparatus of the present invention may be molded from semi-rigid plastic non-reactive materials, such as HDPE, and the like. The apparatus may be made of a single piece of molded plastic of HDPE or the like.

For a typical funnel apparatus of the present invention to be used with a 2 or 5 gallon JUSTRITE disposal container or similar container, the internal diameter of the ventilation line may be about 2 to 5 mm, preferably about 3 mm, and the internal diameter of the stem of the funnel 41 may be about 7 to 15 mm, preferably about 10 mm. In the particular embodiment shown in FIGS. 2 AND 3, the adaptor 26 is substantially bent at an angle at the lower end of the adaptor to accommodate the angular opening of the solvent container such that the funnel is situated upright and level to the ground to prevent spills during solvent disposal.

In the particular embodiment shown in FIGS. 6 and 7, the adaptor is substantially vertical at the lower end of the adaptor to accommodate the vertical opening of the carboy solvent container such that the funnel is situated upright and level to the ground to prevent spills during solvent disposal. Accordingly the reader will recognize that, according to the invention, we have provided a funnel which virtually eliminates atmospheric contamination from evaporated solvents, precludes the need for a user to recap such funnels after use, to provide an ecologically friendly funnel, and to reduce the incidence of cancer and other deleterious health effects (smog, haze, unbluing of the sky, asthmatic effects, destruction of the protective ozone layer, etc . . . ) from solvent evaporation.

While the above description contains many specificities, these should not be construed as limitations on the scope of the invention, but as exemplifications of the presently preferred embodiments thereof. Many other ramifications and variations are possible within the teachings of the invention. For example, the funnel need not have a circular configuration when seen from the top, but can be oval, rectangular, triangular, etc. The materials recommended for the various parts shown may be varied, so long as they are compatible with the solvents used. The funnel need not be used with a carboy, but can be used with any other disposal receiver or system, including a drum like receiver.

Optionally, the closure cap may be omitted during use at the risk of some minor loss of solvent vapor retention. A separate seal may be provided between the neck of the carboy and the outside of the stem of the funnel. The body of the funnel can have generally parallel sides with a tapered lower portion and the stem of the funnel need not be tapered.

A step-on foot pedal may be used as a mechanical means to open the lid during solvent disposal. In lieu of a step-on foot pedal, an electronic (e.g., infra-red) detector which detects the approach of a user of the apparatus can be used to open the lid automatically. In addition, other methods known in the art may be employed for opening a lid such as those employed to open lids on disposal or trash containers.

Thus the scope of the invention should be determined by the following claims and their legal equivalents, and not limited by the examples provided herein.

What is claimed is:

1. An ecological funnel apparatus for use with a solvent container, comprising:
   (a) a funnel having a conical, tapered body portion having a relatively wide open upper end and a relatively narrow lower end defining an internal passage therethrough, the funnel comprising means for displacing air and configured to extend from a position within the upper end of the funnel through the stem of the funnel, and
   (b) an adaptor for adapting the funnel and the solvent container, the adaptor comprising,
      (i) an upper portion configured for mounting and seating the funnel to the adaptor,
      (ii) a lower portion for inserting into the solvent container and mounting the adaptor onto the solvent container, wherein the lower portion comprises a terminal extension that extends into the solvent container by a length sufficient to preserve an air reserve volume in the container that is equal to or greater than a maximum fill volume of the funnel body,
      (iii) an internal passage extending from the upper portion of the adaptor to the lower portion of the adaptor through the terminal extension, wherein the internal passage is in fluid communication with the means for displacing air, the internal passage of the conical body and the terminal opening of the adaptor, and
      (iv) a coupling mechanism attached to the adaptor for securely mounting the adaptor to the solvent container to form an airtight seal.

2. The funnel apparatus of claim 1 wherein means for displacing air comprises at least one ventilation line or an unobstructed pathway configured to direct liquid away from displaced air.

3. The funnel apparatus of claim 1 further comprising a closure cap attached to the upper end of the funnel body, the cap having a top face and a bottom convex face, wherein the cap is configured with the funnel to create a liquid and airtight seal when closed.

4. The funnel apparatus of claim 3 wherein the cap is further configured with a hinge for movement between fully opened and closed positions.

5. The funnel apparatus of claim 1 further comprising a filter mounted in the body of the funnel.

6. The funnel apparatus of claim 1 wherein the lower portion of the adaptor is configured to securely fit and engage the opening of the solvent container to form an airtight seal.

7. The funnel apparatus of claim 1 wherein the lower portion comprising the terminal extension is cylindrical and the diameter of the internal passage at the lower portion of the adaptor is substantially the same size as the diameter of the internal passage at the top of the adaptor.

8. The funnel apparatus of claim 7 wherein the diameter of the internal passage at the lower portion of the adaptor is larger or smaller than the diameter of the internal passage at the top of the adaptor.

9. The funnel apparatus of claim 3 wherein the closure cap further comprises a latch for locking the cap to the funnel.

10. The funnel apparatus of claim 3 wherein the closure cap is attached to the body of the funnel with a multi-angle adjustable, dual hinge mechanism.

11. The funnel apparatus of claim 1 wherein the upper portion of the adaptor is attached to the funnel by an attachment selected from the group consisting of ring clamps or annular clamps, latches, threaded engagement, threaded locking collar connectors with circumferential grooves or threads, or tightening screws.

12. The funnel apparatus of claim 11 wherein the adaptor is coupled by threaded engagement with the funnel to form an airtight seal.

13. The funnel apparatus of claim 1 wherein the funnel and the adaptor are of unitary construction.

14. The funnel apparatus of claim 1 wherein the coupling mechanism is selected from the group consisting of ring clamps or annular clamps, threaded engagement, threaded locking collar connectors with circumferential grooves or threads, tightening screws, latches, securing mechanisms, tightening or adjustable bolts or bands, adjustable compression buckles or straps, quick release ratchet buckles, straps or lever.

15. The funnel apparatus of claim 14 wherein the coupling mechanism further comprises a sealing O-ring.

16. The funnel apparatus of claim 15 including locking means for locking the adaptor to the solvent container.

17. The funnel apparatus of claim 1 that is made from chemically resistant or inert material.

18. The funnel apparatus of claim 17 wherein the chemically resistant material is HDPE, Polyprolylene, stainless steel, or Teflon.

19. The funnel apparatus of claim 1 wherein the adaptor is configured to be adapted to a solvent container and adapted such that the opening lip at the upper end of the funnel is parallel with the ground.

20. The funnel apparatus of claim 1 further comprising a flame arrestor mounted in the funnel.

21. An ecological funnel apparatus for use with a solvent container, comprising:
   (a) a funnel having a conical, tapered body portion having a relatively wide open upper end and a relatively narrow lower end defining an internal passage therethrough, the funnel comprising means for displacing air and configured to extend from a position within the upper end of the funnel through the stem of the funnel, and
   (b) an adaptor for adapting the funnel and the solvent container, the adaptor comprising,
      (i) an upper portion configured for mounting and seating the funnel to the adaptor,
      (ii) a lower portion for inserting into the solvent container and mounting the adaptor onto the solvent container, wherein the lower portion comprises a terminal extension that extends into the solvent container by a length sufficient to preserve an air reserve volume in the container that is equal to or greater than a maximum fill volume of the funnel body,
      (iii) an internal passage extending from the upper portion of the adaptor to the lower portion of the adaptor through the terminal extension, wherein the internal passage is in fluid communication with the means for displacing air, the internal passage of the conical body and the terminal opening of the adaptor, and
      (iv) a coupling mechanism attached to the adaptor for securely mounting the adaptor to the solvent container to form an airtight seal; and
   (c) a solvent container selected from the group consisting of carboys, JUSTRITE containers, EAGLE containers, Pig Corporation containers, Protectoseal containers, glass or HDPE containers, various solvent disposal containers made form high density polyethylene (HDPE) or polypropylene materials, or drums.

22. An ecological funnel apparatus for use with a solvent container, comprising:
   (a) a funnel having a conical, tapered body portion having a relatively wide open upper end and a relatively narrow lower end defining an internal passage therethrough, the funnel comprising means for displacing air and configured to extend from a position within the upper end of the funnel through the stem of the funnel, and
   (b) an adaptor for adapting the funnel and the solvent container, the adaptor comprising,
      (i) an upper portion configured for mounting and seating the funnel to the adaptor,
      (ii) a lower portion for inserting into the solvent container and mounting the adaptor onto the solvent container, wherein the lower portion comprises a terminal extension that extends into the solvent container by a length sufficient to preserve an air reserve volume in the container that is equal to or greater than a maximum fill volume of the funnel body,
      (iii) an internal passage extending from the upper portion of the adaptor to the lower portion of the adaptor through the terminal extension, wherein the internal passage is in fluid communication with the means for displacing air, the internal passage of the conical body and the terminal opening of the adaptor, and
      (iv) a coupling mechanism attached to the adaptor for securely mounting the adaptor to the solvent container to form an airtight seal;
   wherein the funnel and adaptor are formed from a single mold.

23. The funnel apparatus of claim 22, further comprising a filter mounted in the funnel body.

* * * * *